APPARATUS FOR STABILIZING HIGH-GAIN DIRECT CURRENT TRANSISTORIZED SUMMING AMPLIFIER

Filed March 11, 1960 2 Sheets-Sheet 1

MONSON H. HAYES, JR.

INVENTOR

BY Harvey S. Lambert

ATTORNEY

APPARATUS FOR STABILIZING HIGH-GAIN DIRECT CURRENT TRANSISTORIZED SUMMING AMPLIFIER
Filed March 11, 1960 2 Sheets-Sheet 2

MONSON H. HAYES, JR.
INVENTOR
BY [signature]
ATTORNEY 3,218,566

APPARATUS FOR STABILIZING HIGH-GAIN DIRECT CURRENT TRANSISTORIZED SUMMING AMPLIFIER

Monson H. Hayes, Jr., Fullerton, Calif., assignor to General Precision, Inc., Binghamton, N.Y., a corporation of Delaware Filed Mar. 11, 1960, Ser. No. 15,029
3 Claims. (Cl. 330—9)

This invention relates to operational amplifiers and more particularly to apparatus for stabilizing operational amplifiers with respect to drift caused by spurious currents and voltages, as substantially shown and described in an application for United States Letters Patent by this inventor filed July 10, 1958, Serial No. 747,709, now abandoned, of which this is a continuation in part.

Operational amplifiers are amplifiers that are capable of performing one or more mathematical operations upon applied input signals. For example, they may perform the functions of summing, integrating, differentiating, or sign changing. Such amplifiers are employed in analogue computers, simulators, control systems and other applications where the aforesaid mathematical operations are desired. In general, they comprise a high-gain D.C. amplifier, a feedback impedance coupled between the input and the output of the D.C. amplifier and an input impedance coupled to the input of the D.C. amplifier. The mathematical operation performed by a particular operational amplifier depends upon the nature of the circuit parameters employed for the feedback and input impedances. When both impedances comprise a resistance, the operational amplifier functions as a summing amplifier to provide an output signal which represents the algebraic sum of two or more applied input signals. Should the feedback impedance comprise a capacitor, and the input impedance a resistor, the amplifier produces an output signal which is the time integral of an applied input signal. Similarly, when the feedback impedance is a resistor and the input impedance is a capacitor, the output of the amplifier is the derivative with respect to time of the applied input signal. By suitably choosing the circuit parameters of the operational amplifier, a combination of the foregoing mathematical operations may be obtained. While, theoretically, the feedback or input impedance of the amplifier could comprise an inductance element, this type of circuit element is rarely used, due to the low signal frequencies usually encountered in computer applications, which make it difficult to obtain a pure or accurate impedance, such as is possible with the use of resistance or capacitance elements.

Ideally, the D.C. amplifier portion of the operational amplifier should provide an output signal which is an exact magnified image of an applied input signal. That is, $$V_o = -MV_i \quad (1)$$

where $V_o$ is the output voltage, M is the gain of the D.C. amplifier, and $V_i$ is the applied input voltage. This ideal relationship is difficult to obtain in practice, however, because of the existence of two conditions. The first condition relates to variations in the theoretically constant amplifier gain M caused by non-linearities in the amplifier and associated coupling circuits. To overcome this, it is customary to apply negative feedback to the amplifier and to prevent overloading of the amplifier. For this reason, the D.C. amplifier generally consists of an odd number of stages, or includes suitable phase shifting circuits, so that the application of negative feedback may be easily accomplished. The second condition which prevents the attainment of an ideal amplifier characteristic relates to the problem of drift in the amplifier output. This condition manifests itself by the inclusion of an unwanted voltage in the output of the amplifier and may be represented by the following equation:

$$V_o = -MV_i + V_d \quad (2)$$

where $V_d$ is the unwanted, or drift voltage. The drift voltage $V_d$ is caused by the introduction of spurious currents and voltages in the D.C. amplifier itself.

Considering first the drift caused by the introduction of spurious voltages, it may be noted that this type of drift arises from many conditions within the amplifier itself. These include ageing and changes in operating temperature of vacuum tubes and circuit elements, as well as variations in plate and heater voltage supplies. Since the magnitude of a drift voltage resulting from the injection of a spurious voltage at a point in the D.C. amplifier is the product of the voltage gain of the amplifier between the point of spurious voltage injection and the output of the amplifier and the magnitude of the spurious voltage injected, it is apparent that the first stage of a multi-stage amplifier is the most important as far as drift is concerned. Accordingly, it is customary to refer all spurious voltages to the first stage of the amplifier and to represent the resultant output drift of the amplifier in terms of a fictitious spurious voltage appearing at the input of the first amplifier stage. Several methods of eliminating drift caused by these spurious voltages are known. One such method involves the periodic manual adjustment of a bias control located on the D.C. amplifier, whereby a zero output voltage for a zero input voltage condition may be obtained. Another method makes use of the known drift-free property of A.C. amplifiers by employing so-called "chopper-modulated" amplifiers. These amplifiers function by converting an applied D.C. input signal to a pulsating D.C. signal, amplifying the pulsating D.C. signal in an A.C. amplifier, and then rectifying the amplified signal to obtain its original D.C. form. The converting and rectifying functions of chopper-modulated amplifiers may be performed by mechanical means, such as vibrating contacts, or non-mechanical means, such as unidirectional conducting circuit elements. Unfortunately, the frequency bandwidth of these chopper-modulated amplifiers is not very large, due to the fact that the reconstituted D.C. output signal must be smoothed by appropriate filter networks, which of course have an inherently small bandwidth. Even though the operational amplifier itself may have a very low frequency response, usually extending down to D.C., the limitations on overall frequency response of the chopper type amplifiers prevent their use in many applications. Furthermore, the gain of a chopper-modulated amplifier is much lower than that obtained with a corresponding conventional D.C. amplifier.

Considering now the problems associated with drift caused by the introduction of spurious currents in the D.C. amplifier, it may be seen that these problems are not as easily solved as those arising from the introduction of spurious voltages. In a vacuum tube type of D.C. amplifier, for example, the spurious currents may consist of an electron current flow caused by electrons striking the grid of a tube and/or an ion current flow into the grid. Since it is usually impossible to distinguish between these spurious grid currents and the normal grid current for an applied input signal, drift correction is rendered extremely difficult. Fortunately, however, the spurious grid current in most vacuum tube amplifiers may be kept down to a very low value by the use of well known production techniques. For example, in a vacuum tube amplifier having an impedance level of approximately one megohm, it is possible to keep the spurious grid current down to the order of $10^{-9}$ amperes, so that the output drift voltage will be only about one millivolt. Since this is a reasonable drift level for most applications, the problem of correction for drift due to spurious grid currents has not been an extremely critical one for vacuum tube operational amplifiers. Under certain conditions, however, namely, when the D.C. tube amplifier is employed for integrating operations and the feedback impedance comprises a capacitor, the output voltage drifts at a rate of $I_g/C$ volts/second, where $I_g$ is the spurious grid current and C is the value of the feedback capacitor. Assuming now that the amplifier has the same 1 megohm impedance level, it may be seen that this would cause the output voltage to drift at the rate of 1 millivolt/second, which would of course be objectionable for many applications.

When a transistor amplifier is employed for the high-gain D.C. amplifier in an operational amplifier, the problem of drift caused by spurious currents becomes extremely important. This follows from the fact that the cut-off collector current of the transistor varies as a function of temperature. Therefore, when the D.C. transistor amplifier is arrangeed for base input operation which is probably the most commonly used operating configuration, the cut-off collector current flows directly into the base element, thereby causing a variation in base current which produces a corresponding drift in the output of the operational amplifier. Since the cut-off collector current approximately doubles in value for every 10° C. change in temperature, it may be readily seen that the resulting voltage drift becomes intolerable for most applications. Even the silicon junction transistor, which has a variation in cut-off collector current only about 1 microampere for a temperature range of zero to 50° C., is unsatisfactory, since it would produce a resultant voltage drift of about one volt.

Accordingly, it is an object of this invention to provide apparatus for stabilizing operational amplifiers with respect to drift caused by the introduction of spurious currents in the amplifier.

It is a further object of this invention to provide apparatus for stabilizing operational amplifiers with respect to drift caused by the introduction of both spurious currents and voltages in the amplifier.

It is a still further object of this invention to provide apparatus for stabilizing operational amplifiers with respect to drift caused by the introduction of both spurious currents and voltages in the amplifier, which apparatus is adapted to stabilize a plurality of operational amplifiers.

Briefly, the stabilizing apparatus of this invention comprises a spurious current detecting impedance which forms the coupling between the input of the high-gain D.C. amplifier and the circuit junction of the input and feedback impedances of the operational amplifier to be stabilized. The detecting impedance is operable to cause an error potential to exist at the circuit junction of the input and feedback impedances in response to spurious current existing in the input of the D.C. amplifier. A driftless D.C. amplifier, which may be of the chopper-modulated type, is coupled between the input of the high-gain D.C. amplifier and the circuit junction of the input and feedback impedances, so that the driftless amplifier supplies an output current to the input of the D.C. amplifier which cancels the spurious current therein. By this means, the output of the operational amplifier is stabilized with respect to drift caused by spurious currents existing in the input of the high-gain D.C. amplifier. In one embodiment of the invention, the spurious current detecting impedance comprises a capacitor, while in another embodiment it comprises a resistor. The invention also contemplates means for stabilizing the operational amplifier with respect to drift caused by the introduction of spurious voltages, and for this purpose, employs a second driftless D.C. amplifier. Additionally, a novel time-sharing arrangement is utilized to permit the stabilizing apparatus of the invention to simultaneously stabilize a plurality of operational amplifiers.

Figure 1:
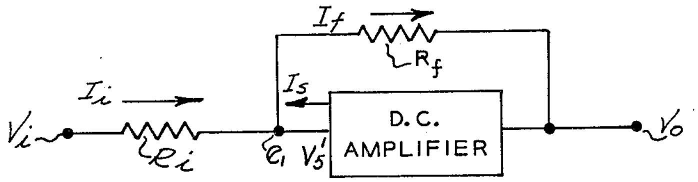
FIG. 1 is a schematic circuit diagram of a conventional operational amplifier arranged for summing operation, which is used to explain the operating principles of the invention.

Referring now to FIG. 1 of the drawing, there is shown a summing amplifier comprising a high-gain D.C. amplifier, a feedback resistor $R_f$ and an input resistor $R_i$. While only a single input resistor is illustrated, it will be understood that in practice a number of input resistors are employed, the number being equal to the number of signals to be summed. The D.C. amplifier may consists of any conventional amplifier, such as a vacuum tube amplifier, a transistor amplifier, or a magnetic amplifier. An expression for the drift voltage $V_d$ at the output terminal of the summing amplifier caused by spurious currents $I_s$ and spurious voltages $V_s$ from the input stage of the D.-C. amplifier will now be developed. Since the sum of all the currents at the circuit junction $e_1$ of the input resistor $R_i$ and the feedback resistor $R_f$ must be equal to zero, the following relationship results:

$$(3) \qquad I_i+I_s-I_f=0$$

where $I_i$ is the input current through resistor $R_i$, $I_s$ is the spurious current from the input stage of the D.-C. amplifier, and $I_f$ is the feedback current through the feedback resistor $R_f$. This equation may also be written as $$(4) \qquad \frac{V_i-V_1}{R_i}+I_s-\frac{V_1-V_0}{R_f}=0$$

where $V_i$ is the input voltage to resistor $R_i$, $V_1$ is the voltage at junction $e_1$ and $V_o$ is the output voltage.

Also, the output voltage $V_o$ must be equal to:

$$(5) \qquad V_o=-A(V_1+V_s)$$

where $V_s$ is the spurious voltage from the input stage of the D.-C. amplifier.

Equation 5 may be used to solve for $V_1$ to provide:

$$(6) \qquad V_1=-V_s\frac{V_0}{A}$$

Substituting the expression for $V_1$ from equation (6) into equation (4) the following expression is obtained:

$$(7) \qquad \frac{V_1+V_s+\frac{V_o}{A}}{R_i}+I_s\frac{-V_s\frac{-V_o}{A}-V_o}{R_f}$$

When the gain A of the D.-C. amplifier is very large, expression (7) reduces to:

$$(8) \qquad +V_o=-V_i\frac{R_f}{R_i}-I_sR_f-V_s\left(1+\frac{R_f}{R_i}\right)$$

or $$\frac{V_i}{R_i}+\frac{V_o}{R_f}=-I_s-V_s\left(\frac{1}{R_i}+\frac{1}{R_f}\right)$$

It may be noted that Equation 8 is quite similar in form to Equation 2 and that the terms $I_sR_f$ and $$V_s\left(1+\frac{R_f}{R_i}\right)$$

represent the drift voltage $V_d$, the first term being due to the spurious current $I_s$ and the second term being caused by the spurious voltage $V_s$. From the foregoing equation, it is also apparent that one portion of the drift voltage $V_d$ is caused by the spurious current in the amplifier input flowing through the feedback resistor and the other portiton of the drift voltage is caused by the spurious voltages dividing themselves between the feedback resistor $R_f$ and the input resistor $R_i$. Since the above mathematical analysis is general in nature, it applies to D.C. amplifiers of any type, including vacuum tube amplifiers, transistor amplifiers, and magnetic amplifiers.

Figure 2:
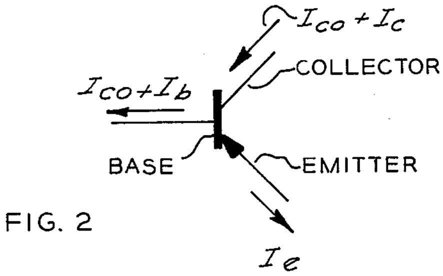
FIG. 2 is a schematic diagram showing the base and cut-off collector currents in a typical transistor arranged for base input operation.

As pointed out previously, when a vacuum tube D.C. amplifier is employed in the operational amplifier, the drift voltage caused by the spurious grid current is not of critical importance, since the spurious grid current of such amplifiers may be kept extremely low by well known manufacturing techniques. However, when a transistor amplifier is employed for the D.C. amplifier portion of the operational amplifier, the large variations in cut-off collector current with temperature produce a very large drift. As may be seen in FIG. 2 of the drawing, the cut-off collector current $I_{co}$, which flows in the collector element of the transistor, also flows in the base element of the transistor and combines with the base current $I_b$. Since the cut-off collector current changes in magnitude with temperature, the resultant drift voltage may not be eliminated by conventional stabilizing apparatus of the type used for spurious voltages, such as the adjustable bias technique, for example. Accordingly, some means must be provided to detect the spurious base current in the input to the transistor and to cancel it, so that the spurious current is prevented from flowing in the feedback circuit. While the following disclosure relates to a transistor D.C. amplifier, it is apparent that the techniques disclosed are equally applicable to vacuum tube amplifiers or magnetic amplifiers.

Figure 3:
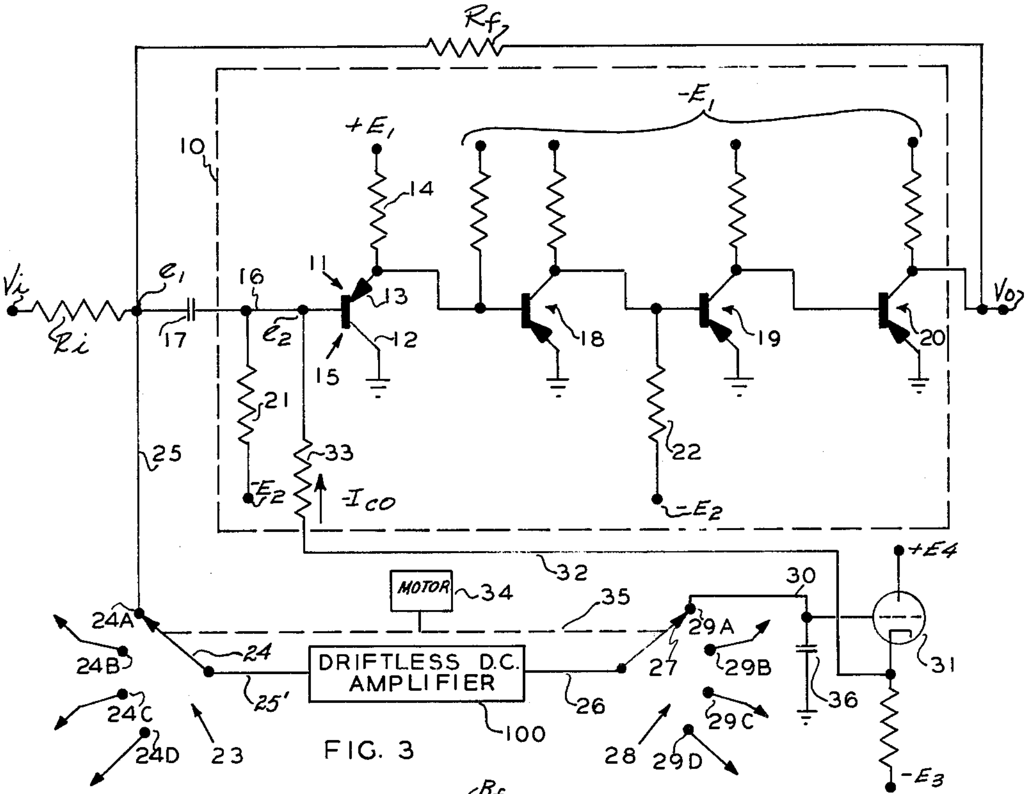
FIG. 3 is a schematic circuit diagram of an operational amplifier employing the stabilizing apparatus of the invention.

FIG. 3 of the drawing shows an operational amplifier comprising a high-gain D.C. transistor amplifier 10 arranged for base input operation. The first stage of the transistor amplifier comprises a transistor 11 arranged for base input-grounded collector operation. The transistor 11 has a collector element 12 which is directly connected to ground and an emitter element 13 which is connected to a suitable positive supply voltage source $+E_1$ through a resistor 14. The base element 15 of the transistor is coupled by a lead 16 and a capacitor 17 to the circuit junction $e_1$ of the feedback resistor $R_f$ and the input resistor $R_i$. Transistors 18, 19 and 20 form the remaining stages of the D.C. amplifier 10 and are arranged for base input-grounded emitter operation in accordance with established practice. A suitable source of negative bias voltage $-E_2$ is applied to the base inputs of transistors 11 and 19 through the respective dropping resistors 21 and 22, while a negative supply voltage source $-E_1$ is coupled to the collecter elements of transistors 18, 19 and 20.

Figure 5:
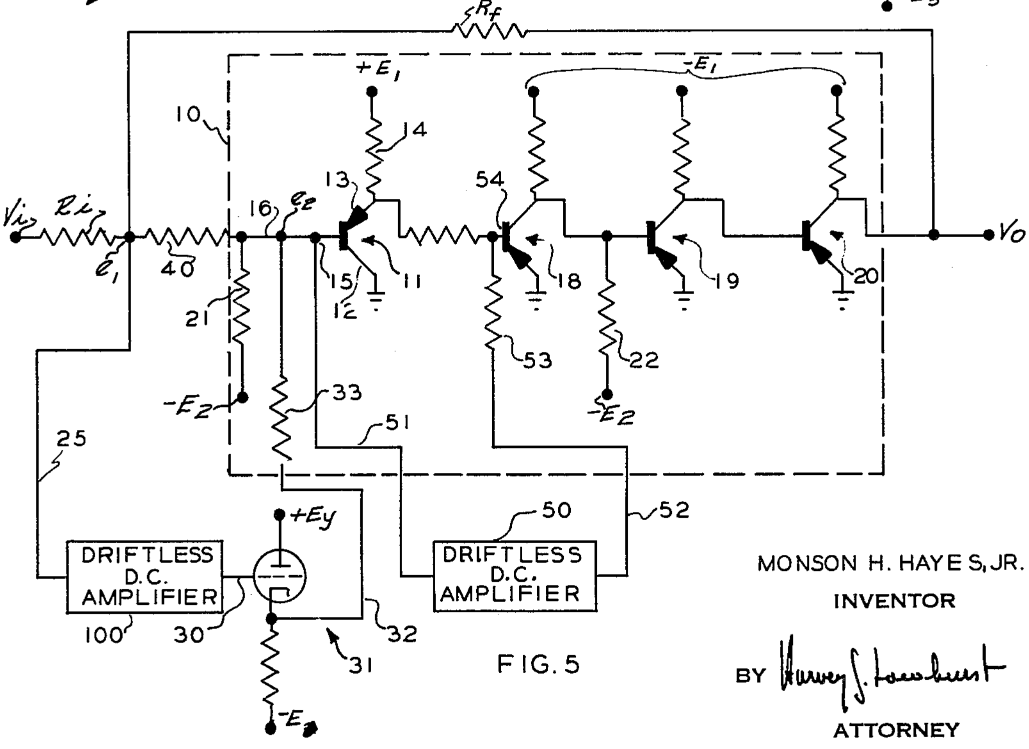
FIG. 5 is a schematic circuit diagram of an operational amplifier stabilized by the apparatus of the invention with respect to drift caused by both spurious currents and voltages.

It may be noted that the capacitor 17 forms the coupling between input base element 15 of transistor amplifier 10 and the circuit junction $e_1$ of the input and feedback resistors. Accordingly, the spurious base current or cut-off collector current $I_{co}$ of the transistor amplifier is prevented from flowing through the feedback resistor $R_f$. While the capacitor 17 blocks the flow of a steady state base current, it will not prevent the potential at junction $e_1$ from drifting as the value of $I_{co}$ changes with temperature. Thus, the use of capacitor 17 alone is not sufficient to prevent the output of the operational amplifier from drifting. In order therefore to cancel the cut-off collector current in the input lead 16 of the transistor amplifier, a driftless D.C. amplifier 100 is coupled across the capacitor 17, between the circut junction $e_1$ and the base input 15 of the transistor amplifier. The driftless D.C. amplifier 100 may comprise any conventional positive gain amplifier that is stabilized with respect to drift and has a reasonably high gain. For example, a suitable driftless D.C. amplifier of the chopper-modulated type is shown in FIG. 5.36 on page 232 of "Electronic Analog Computers" by Korn and Korn, Second Edition, 1956. The input of the driftless D.C. amplifier is connected by a lead 25', a movable contact 24 of a stepping switch 23, fixed contact 24A of the stepping switch, and a lead 25 to the circuit junction $e_1$ of the input and feedback resistors. The output of the driftless amplifier is connected by a lead 26, a movable contact 27 of a second stepping switch 28, a fixed contact 29A of the stepping switch 28, a lead 30, a cathode follower circuit 31, a lead 32, and a resistor 33 to the input of the transistor amplifier. The remaining fixed contacts 24B, 24C and 24D of stepping switch 23 are coupled in a similar manner to the circuit junctions of the input and feedback resistors of other operational amplifiers to be stablized. Similarly, fixed contacts 29B, 29C and 29D of stepping switch 28 are coupled to the base inputs of the other amplifiers to be stabilized. The movable contacts 24 and 27 of the stepping switches are synchronously driven by a motor means 34 through a drive arrangement, indicated schematically as 35.

By virtue of this time-sharing arrangement, the driftless D.C. amplifier 100 is periodically coupled to the pair of fixed stepping switch contacts associated with each operational amplifier to be stabilized, so that a single driftless amplifier may stabilize a plurality of operational amplifiers. A "storage" capacitor 36 is shunted across the output of the driftless D.C. amplifier to maintain the output of the amplifier, as applied to a particular operational amplifier, substantially constant during the period when the driftless amplifier is not actually coupled to that operational amplifier. The cathode follower circuit 31 is included in the coupling between the output of the driftless amplifier and the input of the transistor amplifier, to provide the necessary low source impedance for operation into the low impedance input of the transistor amplifier. It is believed apparent however, that if the D.C. amplifier portion of the operational amplifier were to comprise a vacuum tube type amplifier, the cathode follower circuit could be omitted. Additionally, it may be pointed out that the storage capacitor may be omitted when the time-sharing arrangement is not employed.

The operation of this invention may best be understood by analyzing the change in circuit behavior on introducing amplifier 100 and capacitor 17 between junction points $e_1$ and $e_2$. As long as junction points $e_1$ and $e_2$ are connected by a conductive lead and amplifier 100 is omitted, spurious current $I_s$ flows into junction $e_1$ (or changes its potential) and combines with input current $I_i$ (or input potential $V_i$) to become indistinguishable therefrom. Next, consider the effect of substituting a positive gain amplifier 100 for the conductive lead between points $e_1$ and $e_2$. Since amplifier 100 has a very high back impedance, spurious current $I_s$ cannot easily flow from junction point $e_2$ towards junction point $e_1$. Instead, it raises the voltage level of junction point $e_2$ which appears to negative gain amplifier 10 as an error signal and which is amplified to raise output voltage $V_o$. As soon as the output voltage $V_o$ starts increasing, it causes current flow through feedback resistor $R_f$. The flow of feedback current raises the potential level at point $e_1$ and, assuming input voltage $V_i$ to be zero or unchanged, an error signal is developed which owes its existence solely to spurious current $I_s$. Since positive gain amplifier 100 greatly amplifies the error signal, the output signal from amplifier 100, being of opposite polarity to that of $e_2$, lowers the potential level of junction point $e_2$ to eliminate or compensate for the effects caused by spurious current $I_s$. Of course, if input voltage $V_i$ causes the change in output voltage $V_o$, then amplifier 100 will merely act as an additional stage of the summing amplifier without affecting its performance. The reason therefor is, of course, that the summing junction $e_1$ is ahead of amplifier 100.

The real clue to the understanding of this invention is found in considering all drift effects to originate at $e_2$ and to show up as output voltage $\Delta V_o$. Upon feeding $\Delta V_o$ back via $R_f$ to point $e_1$, there is no input voltage $V_i$ to account for $\Delta V_o$ because $e_1$ is sheltered from drift by the back impedance of amplifier 100. Therefore, $\Delta V_o$ becomes an error signal input to amplifier 100, is amplified, and then applied to $e_2$ for compensation. The drift is not altogether eliminated, but rather reduced by a factor equal to the gain of amplifier 100. The penalty paid for inserting driftless amplifier 100 into the summing amplifier and for compensating drift is a substantial decrease in bandwidth. To overcome this limitation, a capacitor 17 may be paralleled with amplifier 100 to provide a low-impedance path to high frequencies. This is an excellent way of solving the dilema except that capacitors have a tendency to charge up when suddenly overloaded with a sharp transient and a long recovery time is necessary for the amplifier to be operative once more. The limitation caused by capacitor 17 is charging and the limitation caused by the absence of capacitor 17 is narrow bandwidth. A compromise can be provided by shunting amplifier 100 by a resistor as will be explained in connection with FIG. 4.

It may be noted that the time constant composed of capacitor 17 and the input impedance of the transistor amplifier is very important, since that time constant must produce a very small change in gain as a function of time as the stepping switches are stepping around for the time-sharing function. The required time constant may be difficult to obtain in many cases, however, because of the problems associated with capacitor 17. Since it is desirable to employ a large capacitor for capacitor 17, it is usually necessary to utilize an electrolytic or tantalytic capacitor in order to keep the physical size of the capacitor reasonably small. Unfortunately, such capacitors have a relatively small natural time constant, which means that they have a relatively high leakage resistance, of the order of one megohm. This is not desirable however, since capacitors of this type must have some finite voltage across their terminals in order to function properly. If any voltage exists across the terminals of a capacitor, a current will flow, and in the described operational amplifier, it will result in drift. For this reason, while the above-described arrangement is operable to reduce drift caused by spurious currents, it may not completely eliminate drift in all applications because of limitations presently existing as to commercially available capacitors.

Figure 4:
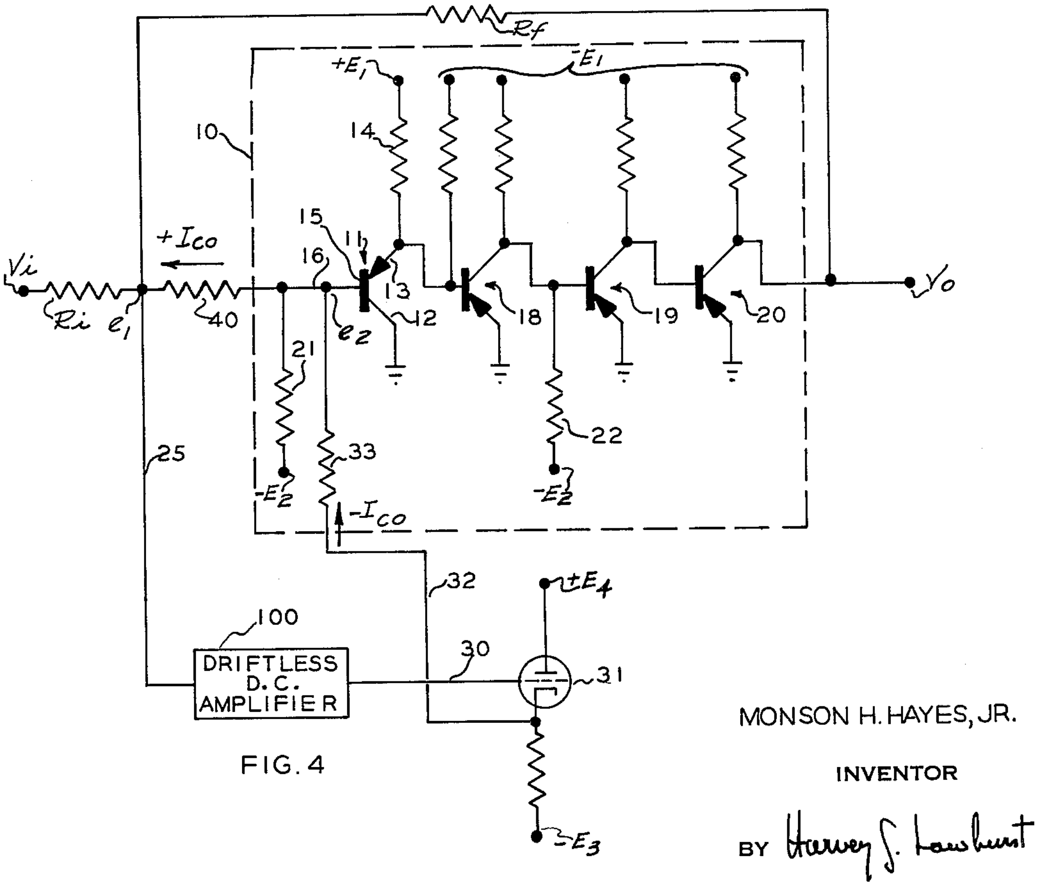
FIG. 4 is a schematic circuit diagram of an operational amplifier employing stabilizing apparatus constituting an alternative embodiment of the invention.

Referring now to FIG. 4 of the drawing, there is shown a preferred embodiment of the invention which does not employ a capacitor as the spurious current detecting impedance. In this figure, the same reference characters are used for the same circuit elements as FIG. 3, and for convenience, the time-sharing arrangement for the driftless D.C. amplifier is omitted. However, it is to be understood that the time-sharing apparatus may be employed if desired. As seen in the drawing, the basic difference between the embodiment of FIG. 4 and the embodiment of FIG. 3 resides in the substitution of a resistor 40 for capacitor 17. While this arrangement operates in substantially the same manner as the arrangement of FIG. 3, there are some differences which result from the substitution of a resistor for a capacitor. For example, the spurious base current flow through the resistor 40 must equal zero in order to eliminate drift. Accordingly, the potential at point $e_2$ must equal the potential at point $e_1$, so that no current flows between the points. This was not required in the embodiment of FIG. 3 however, where it is only necessary to maintain a constant potential difference between the points $e_1$ and $e_2$. In FIG. 4, the driftless D.C. amplifier 100 is set to supply an output current which exactly cancels the cut-off collector current flowing through the resistor 40. It may be noted that the value of resistor 40 is not critical, since its purpose is only to cause an error potential to exist at point $e_1$ in response to the flow of cut-off collector current. Because of this, the magnitude of the resistor determines the loop gain of the D.C. driftless amplifier loop and thereby directly determines the amount that the output voltage drift is reduced in the overall system. A suitable value for the resistor 40 has been found, for example, to be of the order of one megohm.

In order to explain the operation of the stabilizing apparatus of FIG. 4, it may be assumed that the input resistor, the feedback resistor, and the spurious current detecting resistor each have a value of one megohm and further, that the driftless D.C. amplifier 100 is not connected to the operational amplifier. If now the operational amplifier is initially adjusted so that for zero input voltage there is a zero output voltage, the potential at point $e_1$ will be equal to zero. Assume next that the base current increases by one microampere of cut-off collector current. Since the basic input voltage $V_i$ cannot change, because any change in that voltage will of course produce a large output voltage, all of the spurious base current must flow back through the feedback resistor $R_f$. However, the one microampere of spurious base current must also flow through the one megohm resistor 40, so that an error potential of one volt is produced at the junction $e_1$. Assuming now that the driftless D.C. amplifier 100 is connected to the circuit junction $e_1$ of the input and feedback resistors and to the input of the transistor amplifier, and further, that the driftless amplifier has a voltage gain of 1000 with an output resistor 33 of one megohm, it is seen that the voltage output of the driftless amplifier would have to be just one volt in order to supply an output current of one microampere to cancel the spurious current of one microampere. Accordingly, the voltage at the junction $e_1$ has to be only one millivolt in order to produce the required one volt output. Thus, the spurious current is reduced to a value of one millimicroampere.

A mathematical analysis of the circuit of FIG. 4 will now be presented. Let resistor 40 be $R_b$, resistor 33 be $R_c$, gain of amplifier 100 be $+B$, gain of amplifier 10 be $-A$, and the voltage at junction $e_2$ be $V_2$. All remaining symbols have been defined in connection with the derivation of Equation 8.

The current equations for junctions $e_1$ and $e_2$ are, respectively:

$$\frac{V_i-V_1}{R_1}-\frac{V_1-V_o}{R_f}-\frac{V_1-V_2}{R_b}=0 \tag{9}$$

$$\frac{V_i-V_2}{R_b}+\frac{BV_1-V_2}{R_o}+I_s=0 \tag{10}$$

and the voltage equation useful for elimination of $V_2$ is:

$$V_o=-A\ (V_s+V_2) \tag{11}$$

Combining Equations 9, 10 and 11 and assuming A to be very large as was done when deriving Equation 8, the following expression is obtained:

(12)

$$\left(\frac{R_o}{R_b}+\frac{BR_o}{R_o}\right)\left(\frac{V_i}{R_i}+\frac{V_o}{R_f}\right)=$$

$$-I_s-V_s\frac{1}{R_o}\left(1-\frac{BR_o}{R_b}\right)+\frac{1}{R_b}\left(1-\frac{R_o}{R_b}\right)$$

where $$\frac{1}{R_o}=\frac{1}{R_f}+\frac{1}{R_i}+\frac{1}{R_b}$$

If all resistors are approximately of the same order of magnitude, and amplification factor B is assumed to be large, expression (12) may be reduced to:

$$\frac{V_i}{R_i}+\frac{V_o}{R_f}=-\frac{R_c}{BR_o}I_s-\frac{V_s}{R_b} \quad (13)$$

Comparing Equation 13 with Equation 8

$$\frac{V_i}{R_i}+\frac{V_o}{R_f}=-I_s-V_s\left(\frac{1}{R_i}+\frac{1}{R_f}\right) \quad (8)$$

it is immediately seen that the drift due to $I_s$ is reduced by the amount $R_c/BR_o$ which is approximately equal to $1/B$, i.e. the drift is reduced by a factor equal to the one over the amplification factor of driftless amplifier 100. It is also seen by comparing Equations 13 and 8 that drift due to spurious voltages $V_s$ is not substantially reduced unless $R_b$ is very large.

A similar analysis may be made of the circuit of FIG. 3 to derive the following equation:

$$\frac{V_i}{R_i}+\frac{V_o}{R_f}=-\frac{R_c}{BR_o}I_s-\frac{V_s}{BR_o} \quad (14)$$

where $$\frac{1}{R_o}=\frac{1}{R_f}+\frac{1}{R_i}$$

Equation 14 shows that the use of a capacitor for coupling junction $e_1$ to amplifier 10 reduces the effects due to $I_s$ by a factor $R_c/BR_o$ as before, but that $V_s$ is nuow reduced by a factor $1/B$.

In the analysis of the invention, as thus far described, a consideration of drift caused by the introduction of spurious voltages has been omitted. As explained previously, this type of drift may be caused by variations in the operating temperatures of the amplifier parts and variations in the supply voltages for the amplifier. In transistors, for example, this type of drift is caused by an internal E.M.F. in the transistor itself, which is often referred to as "contact potential." While the effects of drift caused by spurious voltages is of an order much less than the order of drift caused by spurious currents, it nevertheless is important in some applications to obtain a totally drift-free amplifier. Although the foregoing stabilizing apparatus of the invention eliminates drift due to spurious currents in the base input of the transistor amplifier and will to some extent reduce drift caused by contact potential, it will not eliminate the latter type of drift entirely. For this reason, a second driftless D.C. amplifier, as shown in FIG. 5, may be employed. In this figure of the drawing, the same reference characters are utilized for the same circuit elements as in the embodiment of FIG. 4. As seen in FIG. 5, a second driftless D.C. amplifier 50 is arranged to have its input coupled by a lead 51 to the base element 15 of transistor 11. The output of the driftless amplifier is coupled by a lead 52 and an output resistor 53 to the base element 54 of the second-stage transistor 18. By virtue of this arrangement, the second driftless D.C. amplifier supplies an output potential to the input of the second-stage transistor in response to the contact potential existing at point $e_2$ in he input of the first stage, so that the output voltage drift caused by the contact potential at the first stage is eliminated. For example, if the second driftless D.C. amplifier has a voltage gain of 1000, it will reduce the contact potential at point $e_2$ to 1/1000 of its original value and thereby correspondingly reduce the output voltage drift caused by contact potential. The balance of the system shown in FIG. 5 functions exactly in its normal manner, so that the first driftless D.C. amplifier 100 compensates for drift caused by spurious currents and the second driftless D.C. amplifier 50 compensates for drift caused by spurious voltages. It will be understood that the time-sharing arrangement shown in FIG. 3 may be employed for either or both of the driftless D.C. amplifiers. Additionally, the capacitor type of spurious current detecting impedance may be substituted for the resistor 40 in this arrangement, if desired.

It may be appreciated that the driftless amplifiers 100 and 50 are capable of passing only a narrow bandwidth which is substantially the drift current component of the signal. The alternating currents and particularly those of higher frequencies are passed by the coupling resistor 40 and by the transistor amplifier 11 rather than the driftless amplifiers 100 and 50. Therefore, in the operation of the amplifying arrangement of FIGURE 5, the alternating currents are amplified and passed through the transistor amplifiers 11, 18, 19 and 20, while the driftless D.C. amplifiers 100 and 50 function merely to correct the direct current level or drift. Thus, while at first glance it may appear that the direct current amplifier 50 is merely an additional amplifier coupled in parallel with the transistor amplifying stage 11, in actual practice the two amplifiers operate on different frequency components of the signal. Since the direct current gain of the amplifier 50 far exceeds the gain of the transistor amplifiers 11, 18, 19 and 20, this transistor amplifier has negligible effect on the D.C. level. On the other hand the D.C. amplifier 50 will have little or no effect on the alternating currents.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A stabilized operational amplifier comprising a high gain transistorized amplifier coupled to pass direct currents from an input terminal to an output terminal thereof, a feedback resistor coupled between the output terminal and an input summing junction, an input summing resistor coupled to pass input signals to the summing junction, a spurious current detecting impedance coupled between the summing junction and the input terminal of the high gain amplifier, said detecting impedance being operable to establish an error potential at the summing junction corresponding to spurious currents which may exist at the input terminal of the high gain amplifier to cause undesirable drift in the signal passed by the high gain amplifier, a driftless direct current coupled amplifier coupled between the summing junction and the input terminal of the high gain amplifier, said driftless amplifier being operable to generate an output current for effectively cancelling the spurious current in response to the error potential appearing at the summing junction whereby the signal passed by the operational amplifier is stabilized with respect to drift resulting from the spurious current, and a second driftless direct current coupled amplifier coupled to the high gain amplifier and responsive to spurious potentials at the input terminal thereof, said second driftless direct current coupled amplifier having an output terminal coupled to the high gain amplifier for stabilizing signals passed by the operational amplifier with respect to drift caused by said spurious potentials.

2. Apparatus for stabilizing summing amplifiers of the type having a high-gain direct current coupled transistor amplifier arranged for base input operation, the transistor amplifier being a multi-stage amplifier with the first stage thereof arranged for base input-grounded collector operation, a feedback resistance coupled between a summing junction and the output of said transistor amplifier, and at least one input resistance coupled to the summing junction of said transistor amplifier, said apparatus comprising a base current detecting impedance forming the coupling between the base input of said transistor amplifier and the summing junction of said input and feedback resistances, said detecting impedance being operable to cause an error potential to exist at said summming junction in response to the cut-off collector current in the base input of said transistor amplifier, said cut-off collector current causing drift in the output of the summing amplifier, a driftless D.C. amplifier coupled between the base input of said transistor amplifier and said summing junction, said driftless amplifier being operable in response to said error potential to produce an output current at the base input which cancels said cut-off collector current, whereby the output of the summing amplifier is stabilized with respect to drift caused by said cut-off collector current, and a second driftless D.C. amplifier coupled between the base input of said transistor amplifier and the input of a subsequent stage thereof, said second driftless amplifier being responsive to the contact potential at the base input of said transistor amplifier, whereby the output of the summing amplifier is stabilized with respect to drift caused by said contact potential.

3. Apparatus as claimed in claim 2, which further comprises means for intermittently coupling said driftless direct current coupled amplifier to the base input of said transistor amplifier and the summing junction of said input and feedback resistances, so that said driftless amplifier is adapted to stabilize a plurality of summing amplifiers, said last-named means comprising first switching means included in the coupling between the input of said driftless amplifier and said summing junction, second switching means included in the coupling between the output of the driftless amplifier and the base input of said transistor amplifier, means for synchronously operating said first and second switching means, so that said driftless amplifier is periodically coupled to said summing junction and base input, a cathode-follower circuit included in the coupling between said second switching means and the base input of the transistor amplifier, and a storage capacitor shunted across the input of said cathode-follower circuit, said storage capacitor being operable to maintain the output from the driftless amplifier applied to the base input during the periods when the driftless amplifier is not coupled to said summing junction and base input.

References Cited by the Examiner

UNITED STATES PATENTS

| | | | |
|---|---|---|---|
| 2,801,296 | 7/1957 | Blecher | 330—17 |
| 3,015,074 | 12/1961 | Taskett | 330—9 |

OTHER REFERENCES

Korn et al.: "Electronic Analog Computers," 1952 edition, pp. 203-205.

"Electronics," April 1954 (pp. 188-190 relied on).

ROY LAKE, *Primary Examiner.*

BENNETT G. MILLER, *Examiner.*